(12) United States Patent
Moore et al.

(10) Patent No.: US 11,971,273 B2
(45) Date of Patent: Apr. 30, 2024

(54) DEVICES AND METHODS FOR COMPARING AND SELECTING ALTERNATIVE NAVIGATION ROUTES

(71) Applicant: Apple Inc., Cupertino, CA (US)

(72) Inventors: Bradford Moore, San Francisco, CA (US); Christopher Blumenberg, San Francisco, CA (US); Marcel Van Os, Santa Cruz, CA (US); Graham Gyatt, El Granada, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/829,326

(22) Filed: May 31, 2022

(65) Prior Publication Data

US 2022/0291008 A1     Sep. 15, 2022

Related U.S. Application Data

(63) Continuation of application No. 16/576,459, filed on Sep. 19, 2019, now Pat. No. 11,397,093, which is a
(Continued)

(51) Int. Cl.
*G01C 21/36*     (2006.01)
*G01C 21/20*     (2006.01)
*G01C 21/34*     (2006.01)

(52) U.S. Cl.
CPC ......... *G01C 21/3626* (2013.01); *G01C 21/20* (2013.01); *G01C 21/3415* (2013.01);
(Continued)

(58) Field of Classification Search
CPC .......................... G01C 21/3626; G01C 21/20; G01C 21/3415; G01C 21/36; G01C 21/3664; G01C 21/3673; G01C 21/3676
(Continued)

(56) References Cited

U.S. PATENT DOCUMENTS 4,914,605 A     4/1990   Loughmiller et al.
5,289,572 A     2/1994   Yano et al.
(Continued)

FOREIGN PATENT DOCUMENTS

AU     2012261938 A1     1/2014
DE     19531766 A1     3/1997
(Continued)

OTHER PUBLICATIONS

Author Unknown, "'Touch & Go' Owner's Manual," Jul. 2011, 218 pages, Toyota, United Kingdom.
(Continued)

*Primary Examiner* — Isaac G Smith
(74) *Attorney, Agent, or Firm* — Invoke

(57) ABSTRACT

Devices, methods, nd machine-read le media to facilitate intuitive comparison and selection of calculated navigation routes are disclosed. An electronic device for navigation includes a touch-sensitive screen and a processing module for displaying a map, calculating a number or navigation routes simultaneously on the touch-sensitive screen, and receiving a selection of a route. Callouts, or markers for presenting key information about each route, are also displayed discretely on the map. Navigation tiles including key route information and route pictorials can also be created and displayed for each calculated route.

21 Claims, 13 Drawing Sheets

Related U.S. Application Data continuation of application No. 13/486,967, filed on Jun. 1, 2012, now Pat. No. 10,422,654.

(60) Provisional application No. 61/493,086, filed on Jun. 3, 2011.

(52) U.S. Cl.
CPC ......... *G01C 21/36* (2013.01); *G01C 21/3664* (2013.01); *G01C 21/3673* (2013.01); *G01C 21/3676* (2013.01)

(58) Field of Classification Search
USPC ....................................................... 701/533
See application file for complete search history.

(56) References Cited

U.S. PATENT DOCUMENTS

| | | | |
|---|---|---|---|
| 5,845,228 A | 12/1998 | Uekawa et al. | |
| 5,878,368 A | 3/1999 | Degraaf | |
| 6,173,232 B1 | 1/2001 | Nanba et al. | |
| 6,178,380 B1 | 1/2001 | Millington | |
| 6,202,026 B1 | 3/2001 | Nimura et al. | |
| 6,321,158 B1 | 11/2001 | Delorme et al. | |
| 6,321,161 B1 | 11/2001 | Herbst et al. | |
| 6,448,908 B1 | 9/2002 | Hijikata | |
| 6,792,349 B1 | 9/2004 | Chen et al. | |
| 7,158,876 B2 | 1/2007 | Crook | |
| 7,702,456 B2 | 4/2010 | Singh | |
| 7,706,973 B2 | 4/2010 | McBride et al. | |
| 7,860,645 B2 | 12/2010 | Kim et al. | |
| 8,020,104 B2 | 9/2011 | Robarts et al. | |
| 8,188,887 B2 | 5/2012 | Catten et al. | |
| 8,355,862 B2 | 1/2013 | Matas et al. | |
| 8,463,289 B2 | 6/2013 | Shklarski et al. | |
| 8,464,182 B2 | 6/2013 | Blumenberg et al. | |
| 8,606,516 B2 | 12/2013 | Vertelney et al. | |
| 8,607,167 B2 | 12/2013 | Matas et al. | |
| 8,639,654 B2 | 1/2014 | Vervaet et al. | |
| 8,798,918 B2 | 8/2014 | Onishi et al. | |
| 2001/0056325 A1 | 12/2001 | Pu et al. | |
| 2002/0103599 A1 | 8/2002 | Sugiyama et al. | |
| 2004/0070602 A1 | 4/2004 | Kobuya et al. | |
| 2004/0128066 A1 | 7/2004 | Kudo et al. | |
| 2004/0236498 A1 | 11/2004 | Le et al. | |
| 2004/0243307 A1 | 12/2004 | Geelen | |
| 2005/0021227 A1 | 1/2005 | Matsumoto et al. | |
| 2005/0125148 A1 | 6/2005 | Van et al. | |
| 2005/0131631 A1 | 6/2005 | Nakano et al. | |
| 2005/0137791 A1 | 6/2005 | Agrawala et al. | |
| 2005/0149261 A9 | 7/2005 | Lee et al. | |
| 2005/0240344 A1 | 10/2005 | Tomita et al. | |
| 2005/0251324 A1 | 11/2005 | Wiener et al. | |
| 2006/0004680 A1 | 1/2006 | Robarts et al. | |
| 2006/0015246 A1 | 1/2006 | Hui | |
| 2006/0026170 A1* | 2/2006 | Kreitler | G06F 16/29 |
| 2006/0161440 A1 | 7/2006 | Nakayama et al. | |
| 2006/0184317 A1 | 8/2006 | Asahara et al. | |
| 2006/0287818 A1 | 12/2006 | Okude et al. | |
| 2007/0016360 A1* | 1/2007 | Lee | G01C 21/3664 |
| | | | 701/532 |
| 2007/0129886 A1 | 6/2007 | Toms et al. | |
| 2007/0293958 A1 | 12/2007 | Stehle et al. | |
| 2008/0009275 A1 | 1/2008 | Werner et al. | |
| 2008/0040683 A1 | 2/2008 | Walsh | |
| 2008/0062141 A1 | 3/2008 | Chandhri | |
| 2008/0140309 A1* | 6/2008 | Jendbro | G01C 21/3614 |
| | | | 701/533 |
| 2008/0167798 A1 | 7/2008 | Tertoolen | |
| 2008/0238941 A1 | 10/2008 | Kinnan et al. | |
| 2009/0005981 A1 | 1/2009 | Forstall et al. | |
| 2009/0105944 A1 | 4/2009 | Urano et al. | |
| 2009/0138194 A1 | 5/2009 | Geelen | |
| 2009/0143977 A1 | 6/2009 | Beletski et al. | |
| 2009/0169060 A1* | 7/2009 | Faenger | G09B 29/007 |
| | | | 382/113 |
| 2009/0177385 A1 | 7/2009 | Matas et al. | |
| 2009/0254273 A1 | 10/2009 | Gill et al. | |
| 2009/0271109 A1 | 10/2009 | Lee et al. | |
| 2009/0287408 A1 | 11/2009 | Gerdes et al. | |
| 2009/0312942 A1 | 12/2009 | Froeberg | |
| 2010/0045704 A1 | 2/2010 | Kim | |
| 2010/0070253 A1 | 3/2010 | Hirata et al. | |
| 2010/0100310 A1 | 4/2010 | Eich et al. | |
| 2010/0114485 A1* | 5/2010 | Bhogal | G01C 21/3446 |
| | | | 701/414 |
| 2010/0161160 A1 | 6/2010 | Wilson et al. | |
| 2010/0185382 A1 | 7/2010 | Barker et al. | |
| 2010/0241975 A1 | 9/2010 | Kinugawa et al. | |
| 2010/0268448 A1 | 10/2010 | Doan et al. | |
| 2010/0312466 A1* | 12/2010 | Katzer | G08G 1/096827 |
| | | | 701/533 |
| 2010/0324817 A1 | 12/2010 | Hansen et al. | |
| 2010/0328100 A1 | 12/2010 | Fujiwara et al. | |
| 2011/0054780 A1 | 3/2011 | Dhanani et al. | |
| 2011/0106439 A1 | 5/2011 | Huang et al. | |
| 2011/0106592 A1 | 5/2011 | Stehle et al. | |
| 2011/0112759 A1* | 5/2011 | Bast | G01C 21/3423 |
| | | | 701/533 |
| 2011/0144904 A1 | 6/2011 | Pinkus et al. | |
| 2011/0153186 A1 | 6/2011 | Jakobson | |
| 2011/0161119 A1 | 6/2011 | Collins | |
| 2011/0194028 A1 | 8/2011 | Dove et al. | |
| 2011/0224896 A1 | 9/2011 | Napieraj | |
| 2012/0059812 A1 | 3/2012 | Bliss et al. | |
| 2012/0179365 A1 | 7/2012 | Miyahara et al. | |
| 2012/0208559 A1 | 8/2012 | Svendsen et al. | |
| 2012/0253659 A1 | 10/2012 | Pu et al. | |
| 2012/0254804 A1 | 10/2012 | Sheha et al. | |
| 2012/0259541 A1 | 10/2012 | Downey et al. | |
| 2012/0322458 A1 | 12/2012 | Shklarski et al. | |
| 2020/0049526 A1 | 2/2020 | Blumenberg et al. | |

FOREIGN PATENT DOCUMENTS

| | | |
|---|---|---|
| DE | 102009023610 A1 | 12/2010 |
| EP | 0822529 A1 | 2/1998 |
| EP | 1030167 A1 | 8/2000 |
| EP | 1102037 A1 | 5/2001 |
| EP | 1995564 A1 | 11/2008 |
| EP | 2031352 A1 | 3/2009 |
| EP | 2151668 A1 | 2/2010 |
| EP | 2672225 A2 | 12/2013 |
| EP | 2672226 A2 | 12/2013 |
| EP | 2672227 A2 | 12/2013 |
| EP | 2698968 A1 | 2/2014 |
| EP | 2715285 A2 | 4/2014 |
| JP | 2002-243480 A | 8/2002 |
| JP | 2005-114695 A | 4/2005 |
| JP | 2005-274197 A | 10/2005 |
| JP | 2005-283168 A | 10/2005 |
| JP | 2011-038815 A | 2/2011 |
| KR | 10-2001-0044792 A | 6/2001 |
| KR | 2001-0044792 A | 6/2001 |
| KR | 10-2005-0015306 A | 2/2005 |
| KR | 10-0647742 B1 | 11/2006 |
| WO | 2010/081538 A2 | 7/2010 |
| WO | 2011/124273 A1 | 10/2011 |
| WO | 2011/146141 A1 | 11/2011 |
| WO | 2012/034581 A1 | 3/2012 |
| WO | 2012/141294 A1 | 10/2012 |
| WO | 2012/167148 A2 | 12/2012 |
| WO | 2013/184348 A2 | 12/2013 |
| WO | 2013/184444 A2 | 12/2013 |
| WO | 2013/184449 A2 | 12/2013 |
| WO | 2014/151155 A1 | 9/2014 |

OTHER PUBLICATIONS

Author Unknown, "Android 2.3.4 User's Guide", May 20, 2011, pp. 1-384, Google, Inc.

(56) References Cited

OTHER PUBLICATIONS

Author Unknown, "Garmin. nivf 1100/1200/1300/1400 series owner's manual," Jan. 2011, 72 pages, Garmin Corporation, No. 68, Jangshu 2nd Road, Sijhih, Taipei County, Taiwan.
Author Unknown, "Google Maps Voice Navigation in Singapore," software2tech, Jul. 20, 2011, 1 page, available at http://www.youtube.com/watch?v=7B9JN7BkvME.
International Preliminary Report on Patentability for PCT/US2012/040550.
International Search Report and Written Opinion for PCT/US2014/025121.
International Search Report for PCT/US2012/040550.
Invitation to Pay Additional Fees with Partial Search Report for PCT/US2012/040550.
Portions of prosecution history of AU2012261938.
Portions of prosecution history of EP12730081.2.
Ruhs, Chris, "My Favorite Android Apps: Maps," Jun. 24, 2011, 1 page, available at http://www.youtube.com/watch?v=v2aRkLkLT3s.
Written Opinion for PCT/US2012/040550.

\* cited by examiner

DEVICES AND METHODS FOR COMPARING AND SELECTING ALTERNATIVE NAVIGATION ROUTES

INCORPORATION BY REFERENCE; DISCLAIMER

Each of the following applications are hereby incorporated by reference: application Ser. No. 16/576,459, filed on Sep. 19, 2019, application Ser. No. 13/486,967, filed on Jun. 1, 2012; application No. 61/493,026, filed Jun. 3, 2011. The Applicant hereby rescinds any disclaimer of claim scope in the parent application(s) or the prosecution history thereof and advises the USPTO that the claims in this application may be broader than any claim in the parent application(s).

BACKGROUND

Many portable electronic devices are capable of displaying maps and providing navigational assistance to a user. Such navigational assistance often requires the device to calculate one or more possible routes from a starting point to a destination. What are needed are devices, methods, and machine-readable media to facilitate intuitive comparison and selection of calculated navigation routes on a portable electronic device.

SUMMARY

Devices, methods, and machine-readable media to facilitate intuitive comparison and selection of calculated navigation routes are disclosed.

According to some embodiments, a number of calculated navigation routes can be displayed on a map. Each route may be highlighted in a manner that allows each route to be easily differentiated. For example, each route may be identified with different color or highlighting schemes and/or may be identified by an unobtrusive callout. As disclosed herein, a callout refers to a marker that provides identifying information about a particular route.

According to some embodiments, a user may choose a particular route from a number of displayed routes. Routes may be selected by tapping a touch-sensitive screen display in the area along a particular route and/or the area over the callout associated with a particular route or using any other suitable method, including using a mouse, keyboard, or voice-recognition input mechanism. When a particular route has been selected, the other routes may still be displayed, though less prominently. For example, prior to a route being selected, all available calculated routes may be highlighted with bright colors. Once a particular route has been selected, the highlight colors for the unselected routes can change to more subdued tones. Furthermore, any callouts associated with unselected routes may be removed, faded, made smaller, or otherwise de-emphasized once a particular route has been chosen. Similarly, the selected route may be displayed more prominently than it was prior to being selected.

A callout for a particular route can contain basic identifying information about that route. For example, the name, distance, and estimated travel time for a route may be displayed in the callout. The calculated routes may be prioritized based on a set of user preferences. User preferences may indicate that a user would like to avoid toll roads, avoid traffic, minimize travel distance, minimize travel time, take a scenic route, etc. Based on the user preferences, the device can provide calculated routes in an order that coincides with the user's preferences. For example, 'Route 1' may be the route that most closely matches the user's preferences and 'Route 2' would match the user's preferences less than 'Route 1' but better than 'Route 3,' and so on. The device may also name the routes according to their dominant characteristics (e.g., 'Minimum Travel Time,' 'Minimum Travel Distance,' or 'Scenic Route').

According to some embodiments, the device can display a context-appropriate menu in response to a user input. For example, if the device is in a route selection mode, the user may tap and hold the screen in order to display a menu with options appropriate for that screen, including options to display points of interest, traffic, or terrain. Context-appropriate menus may also vary based on whether the device is in a 'car mode,' a 'walking mode,' or a 'transit mode,' for example.

According to some embodiments, the device may display a map zoomed-in intelligently along a particular route. The level of zoom may depend on, for example, a speed limit, the user's current speed, distance to the next turn, traffic, etc. When the map is zoomed-in on a particular route, callouts for other routes may be displayed to indicate valuable information about the routes, including the direction and distance to the route from the zoomed-in location.

The device may also provide various alternative route-selection user interfaces. For example, the device may display a number of route tiles on a touch-sensitive screen. The tiles can include identifying route information, including, but not limited to, the route name, route distance, estimated travel time. The tile may also include an overview of the route including the names of major roads along the route (for walking and/or driving modes of operation) and indications of where the route requires the user to turn or proceed to an on or off-ramp.

According to further embodiments, the device may recalculate alternative routes while the user is in transit. For example, the device may automatically regenerate new alternate routes while a user is travelling on one route from the original starting point to the destination. The alternate routes may be generated continuously, at predetermined intervals, or upon the occurrence of an event (e.g., upon the device receiving information regarding a traffic accident along the current route). The user may also request new alternate routes.

A user may also add one or more detours to the current route according to one or more embodiments. For example, the user may choose to display points of interest ("POI") along the route. The user can then choose to navigate to one or more of the POIs by tapping the area of the touch-sensitive screen where the POI is displayed. The user may be given the option to reset the chosen POI as the new destination, or simply as a waypoint along the route. According to some embodiments, some POIs may be automatically displayed if certain criteria are met (e.g, gas stations may be displayed if a user is in driving mode and travelling more than a predetermined distance).

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations, or parameters via the API.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
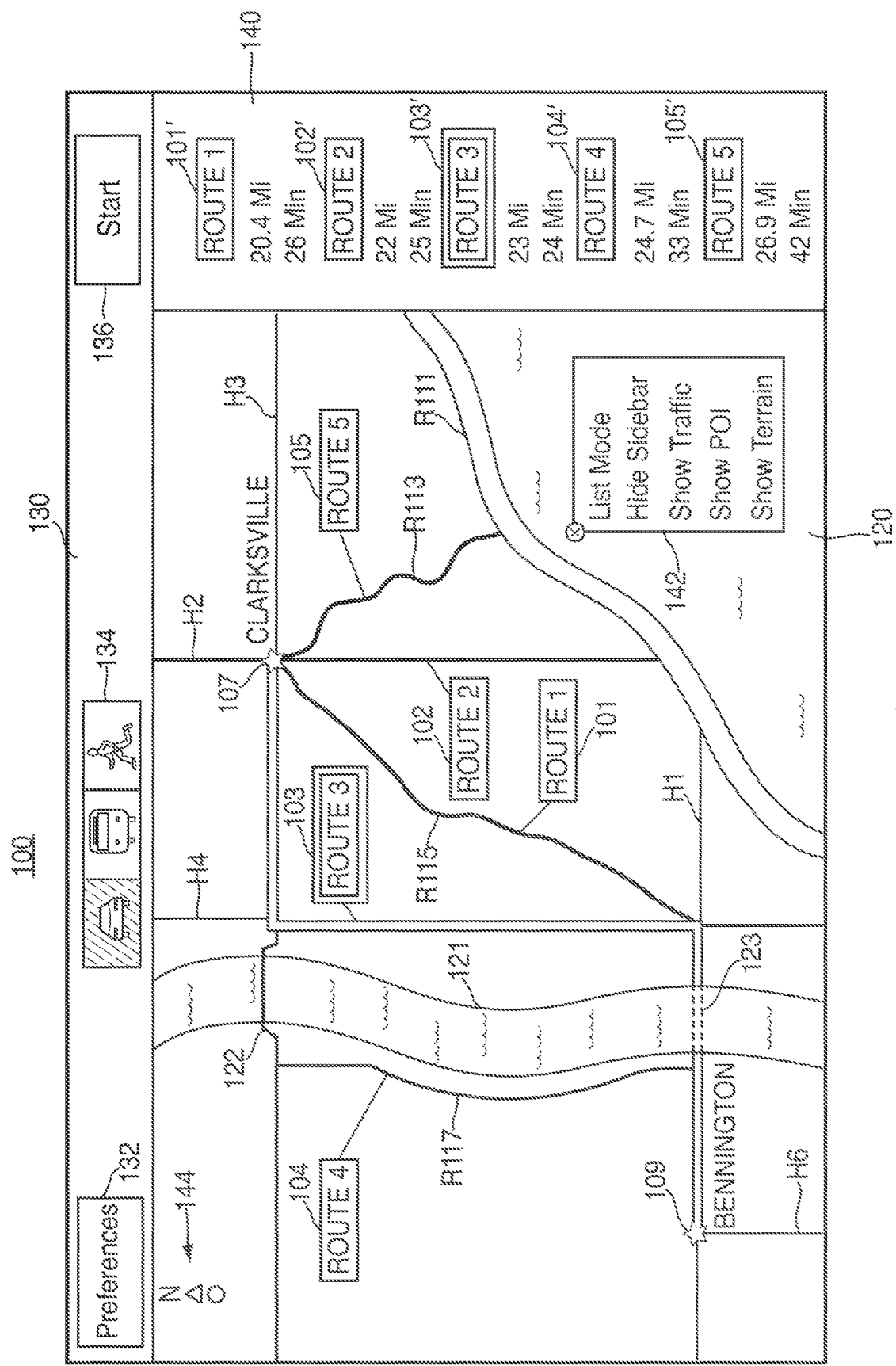
FIG. 1 shows an illustrative screen shot of a map with several alternative routes displayed simultaneously in accordance with various embodiments.

FIG. 1 shows an illustrative screen shot of map 100 with several alternative routes displayed simultaneously in accordance with various embodiments. Map 100 is displayed in landscape mode (i.e., the display is wider than it is tall); however, map 100 may also be displayed in portrait mode (i.e., with the display taller than it is wide). The display mode can be based on the current orientation of the device (e.g., using an accelerometer contained in the device) or the user can choose to lock the display into one preferred mode or the other.

Map 100 includes a number of relevant navigational elements including: highways H1, H2, H3, H4, and H6; secondary roads R111, R113, R115, and R117; route callouts 101, 102, 103, 104, and 105; starting point 107 and destination point 109; ocean 120, river 121, bridge 122, and tunnel 123; context-appropriate menu 142 and compass 144; sidebar 140; and topbar 130, including preferences button 132, navigation-mode button 134, and start button 136. Map 100 may be displayed upon the user indicating that he or she desires to travel by car from starting point 107 in Clarksville to destination point 109 in Bennington.

Route callouts 101, 102, 103, 104, and 105 corresponding to Route 1, Route 2, Route 3, Route 4, and Route 5, respectively, identify the available alternate routes generated by the device. The roads along each route can be highlighted such that each route is easily identifiable and distinguishable from the other routes. For example, each route may be highlighted in a different color. Roads displayed on map 100 that are not along any of the calculated routes may be displayed in a more discrete color and/or in thinner lines than roads that are along one or more routes.

The route callouts in map 100 only display the names given to each route, but can, according to some embodiments, display more information, including distance and estimated travel time for the corresponding route. The amount of information displayed in a callout may be adjusted by the user. For example, the user can indicate a preference to display only the route name in the callout, force the callout to display an additional information field (e.g., the route distance), or display as much information as space permits. According to some embodiments, a user can tap and hold a callout on the touch-sensitive screen to display additional information associated with the route. For example, if a callout normally only displays the route name, tapping and holding the callout or its associated route can result in additional information being displayed, including travel distance and time. In order to display the additional information, the callout may be made larger temporarily, or a pop-up type box may appear on the screen. Route callouts may generally be displayed on map 100 in a manner that does not obscure any important map elements (e.g., major roads and intersections, cities, towns, etc.).

According to some embodiments, a user can choose a particular route from among the routes displayed on map 100 by tapping the touch-sensitive screen anywhere along the route or by tapping the callout associated with the desired route. Other embodiments may allow a user to use other means of selecting a route, including but not limited to, using a mouse or keyboard, speaking the route name, or using any other suitable method. Once a user has selected a particular route, the route can be distinguished from the other unselected routes in any suitable manner. For example, the selected route may be highlighted even more prominently than it was prior to selection by using a brighter color, thicker lines, and/or increasing the size of the associated callout. Route 3 on map 100 has been highlighted using double lines to indicate that the user has selected that route to travel from starting point 107 to destination point 109. Alternatively or additionally, unselected routes can be faded or otherwise de-emphasized. For example, unselected routes like Route 1 and Route 2 on map 100 may be faded, displayed in a more subdued color, or displayed with thinner lines. Similarly, the callouts associated with unselected routes can be faded, made smaller, or otherwise de-emphasized.

Calculated routes can be prioritized based on a set of user preferences. For example, the user preferences may indicate that a user would like to avoid toll roads, avoid traffic, minimize travel distance, minimize travel time, take a scenic route, travel on a particular road, or stop at a POI en route. The device can calculate which routes best match the user's preferences and rank each route accordingly. Data about the five calculated routes 101', 102', 103', 104' and 105' on map 100 is displayed in sidebar 140. Routes 1-5 are prioritized by travel distance (i.e., Route 1 has the shortest distance and Route 5 has the longest).

Sidebar 140 can provide the user with relevant, context-appropriate information in a manner that does not affect the readability of map 100. Sidebar 140 is located discretely on the side of the display and shows key information regarding five calculated routes 101', 102', 103', 104' and 105' that may allow a user to determine which route is best; however, according to some embodiments, sidebar 140 may be placed in any appropriate section of the screen or omitted completely. Sidebar 140 also need not be displayed simultaneously with the routes. For example, the information displayed in sidebar 140 may be accessed via a context-specific menu and displayed in a separate window. In other contexts, a sidebar may provide other relevant information. For example, during navigation the sidebar may present the user with details about travel speed, distance to the destination, estimated arrival time, nearby POIs, etc. As with callouts, the amount and type of information displayed in the sidebar may be customized by the user.

Context-appropriate menu 142 can be accessed to perform various functions that are relevant to the currently displayed screen. While the device is in route-selection mode (i.e., as displayed on map 100) menu 142 may provide options to enter a list mode (discussed in detail below with respect to FIG. 3), hide the sidebar, show traffic, show POIs, and show terrain. If a user decides to show terrain, the roads and highlighted routes may be altered such that they remain easily visible and distinguishable. Menu 142 may be accessed in any suitable manner, including but not limited to tapping and holding the touch-screen display.

Map 100 can also include topbar 130. Topbar 130 can be disposed at the top of the display and contain high-level options that are always relevant. For example, topbar 130 can include several virtual buttons, such as preferences button 132, navigation-mode button 134, and start button 136, which can be activated by tapping the buttons on the touch-screen display. Activating preferences button 132 can provide the user with a set of customizable options (discussed in detail below with respect to FIG. 7). Navigation mode button 134 provides the user with an easy way to switch between available navigation modes (i.e., driving, transit, and walking modes). Activating Start button 136 may begin navigation along the selected route (e.g., Route 3).

Compass 144 can be displayed in a portion of map 100 to provide directional context for the map without obscuring any important map elements.

Figure 2:
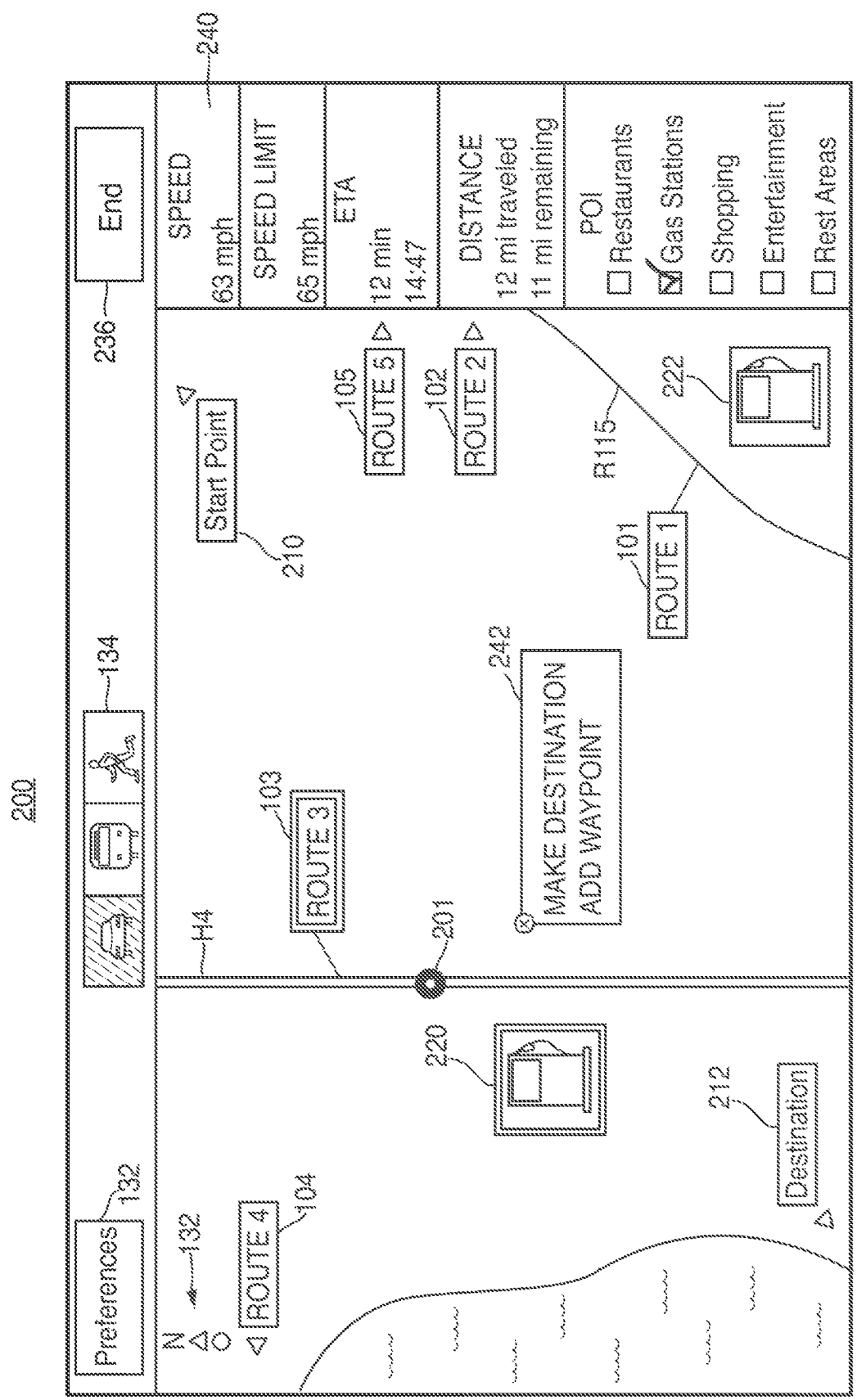
FIG. 2 shows an illustrative screen shot of a zoomed-in map with several alternative routes displayed simultaneously in accordance with various embodiments.

FIG. 2 shows an illustrative screen shot of a zoomed-in map 200 with several alternative routes displayed simultaneously in accordance with various embodiments. Map 200 displays a subsection of the area displayed in map 100 of FIG. 1 while in navigation mode. In particular, map 200 is zoomed in around the current location of the device while the user is traveling on highway H4 en route from the starting point to the destination. Because the device is in navigation mode, start button 136 of FIG. 1 can change to end button 236 of FIG. 2. Starting point 107 and destination point 109 (see FIG. 1) are not visible on map 200; however, callouts 210 and 212 indicate the direction to each of those points, respectively. Callouts 101, 102, 104, and 105 indicate the direction to each alternate unselected Routes 1, 2, 4, and 5, respectively.

The level of zoom for map 200 can be automatically determined based on a number of factors including, but not limited to the user's current speed, the current speed limit, the distance to the next turn, and/or the distance to POIs. For example, if the user is moving relatively quickly along a route and the distance to the next turn is relatively far, the map can be zoomed to a level that displays a large portion, if not all, of the map. Such a zoomed-out view can provide the user with context, including how far they are along the route. However, as the user approaches a turn or other location where more detail would be useful (e.g., as the user approaches a POI or the destination) the map can be automatically zoomed in to a level that provides a useful amount of detail.

Zooming in and out can be accomplished seamlessly by gradually zooming in or out based on at least the factors listed above. For example, a user traveling down a highway at a relatively high speed may be presented with a map view that is zoomed out very far. However, as the user approaches a POI (e.g., a rest area along the highway), the map may gradually zoom in to show the user precisely where the POI is located. In the event that a user is driving relatively slowly through a neighborhood, the map view may remain zoomed in to a very detailed level the entire time. Map 200 is uses a top-down view with the map oriented such that north is up and south is down even though the user is traveling north to south along highway H4. According to some embodiments, the angle and orientation of the map view can be altered to coincide with the point of view of the user. For example, a user driving south along highway H4 may be presented with a map view displaying a view of the highway facing south from a low-elevation point of view.

Sidebar 240 can display a number of fields with information relevant to the user's trip, including the user's current speed, the current speed limit, the estimated time of arrival ("ETA"), distance traveled, distance remaining, and options to show various POIs. Each of the fields in sidebar 240 may be collapsed, for example by tapping the field, in order to provide more space to display additional information.

The POI section of sidebar 240 indicates that the user has chosen to display gas stations along the route. Icons 220 and 222 represent two gas stations that are currently visible on map 200. Icon 220 is highlighted, indicating that the user selected it (e.g., by tapping it). Selecting icon 220 can, according to some embodiments, result in the display of context-appropriate menu 242. Menu 242 can allow the user to set the location of icon 220 as either the new destination or add the location as a waypoint on the way to the original destination point (i.e., destination point 109 of 36 FIG. 1).

Tapping one of the callouts 101, 102, 103, 104, 105, 210, or 212 can result in altering the map view and the information displayed in sidebar 240. For example, tapping callout 212 may result in the map changing to a zoomed-in view of the area around the destination. Similarly, the information in sidebar 240 may change to display a wider range of POIs near the destination. For instance, the list of POIs may expand to include hotels and/or specific well-know tourist attractions (e.g., stadiums and museums). Tapping a callout for an alternate route (e.g., callout 101 for Route 1) may provide the user with information regarding navigation to or by that route. For example, the user may decide, while traveling on Route 3, to switch to Route 4. The device may provide the user with information regarding the distance to Route 4 and an estimation of how much time the route change is expected to add or subtract from the trip.

After a user has navigated along one route for a period of time, the originally calculated alternate routes may become irrelevant to the user. Therefore, according to some embodiments, the device can recalculate alternate routes while a user is navigating from one point to another. Alternate routes may be generated continuously or at predetermined intervals. For example, a user may choose to deviate from the selected navigation route for any number of reasons (wrong turns, detours, rest stops, etc.) and could benefit from having the ability to choose from a set of routes calculated from their current location. Alternate routes may also be calculated upon the occurrence of an event (e.g., upon the device receiving information regarding a traffic accident along the route). So, if the device receives notification that there is a traffic jam along the selected route, alternative routes can be calculated based on the user's current location. The user can select one of the new routes by tapping the route or tapping the new callout associated with the desired route. Newly calculated alternate routes may also be manually requested by the user.

Figure 3:
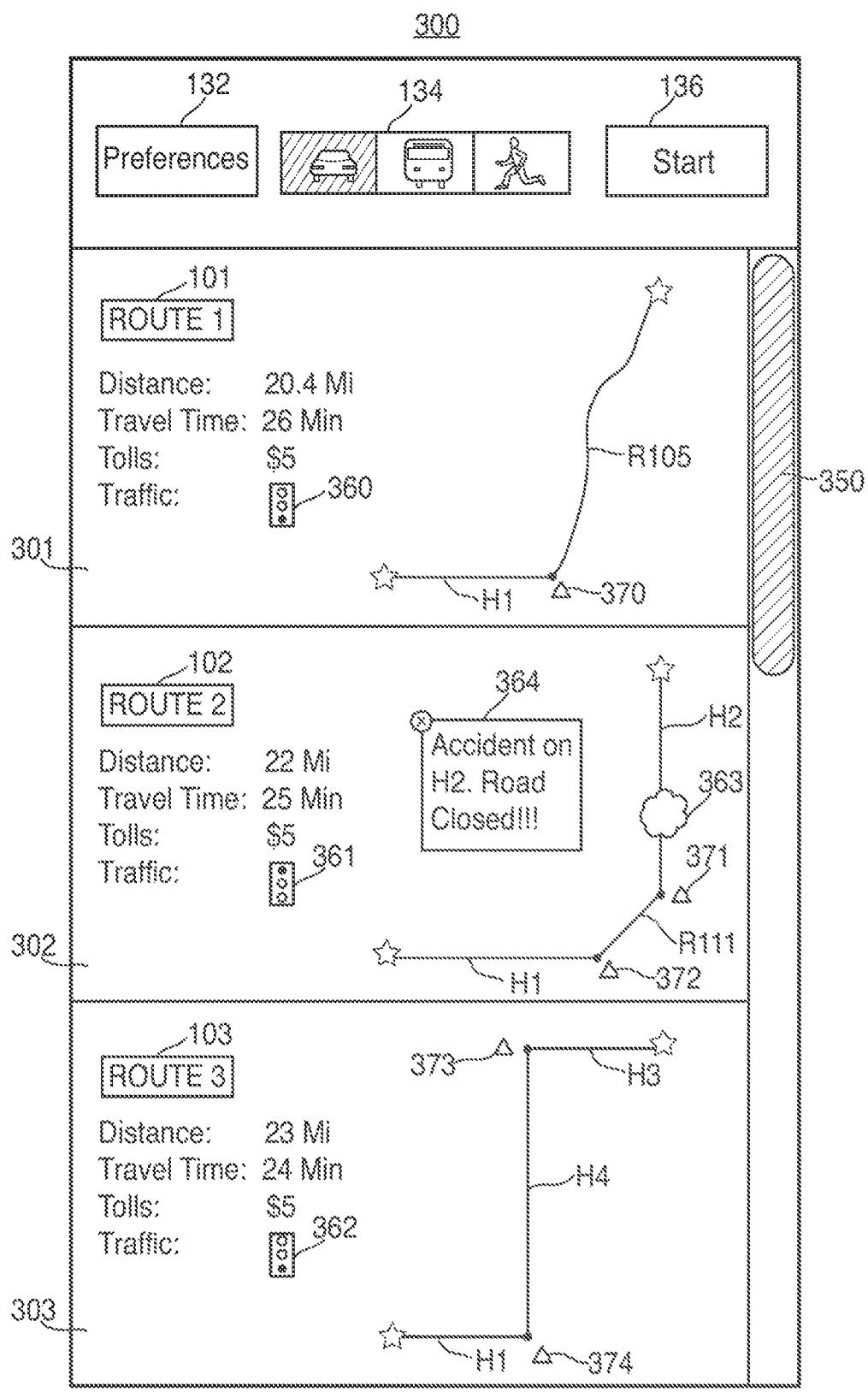
FIG. 3 shows an illustrative screen shot of a list of navigation tiles in accordance with various embodiments.

FIG. 3 shows an illustrative screen shot of a list 300 of navigation tiles in accordance with various embodiments. List 300 shows navigation tiles 301, 302, and 303, which correspond to Route 1, Route 2, and Route 3 (e.g., of FIG. 1). Navigation tiles 301, 302, and 303 include a relatively simple pictorial view of each route on the right-hand side and relatively detailed text information about the routes on the left-hand side. If more calculated routes exist, the user can scroll down (e.g., by dragging a finger upward on the touch-sensitive screen) to view the additional routes. The position of the screen relative to the entire list of navigation tiles may be indicated by the location of scrollbar 350. A user may select a particular route by tapping the desired navigation tile. Once the desired route is selected, the user can tap start button 136 to begin navigation.

Navigation tiles 301, 302, and 303 may provide more detailed text information than can be displayed in a full map view (e.g., map 100 of FIG. 1). For example, in addition to the distance and estimated travel time, a navigation tile may also include information regarding the cost of tolls along the route and traffic status with traffic pictorials 360, 361, and 362. Navigation tile 302 includes red-light traffic pictorial 361, which indicates a traffic problem along the route. The location of the traffic issue is shown on the route pictorial by icon 363. According to some embodiments, the user can tap icon 363 to get detailed description 364 of the traffic issue.

The route pictorials may also include route-change indicators 370, 371, 372, 373, and 374. Route-change indicators can provide a user with a clear understanding of the number and locations of route changes (e.g., turns, on-ramps, and off-ramps) along the route, which may otherwise be difficult to determine without the benefit of a fully detailed map.

Figure 4:
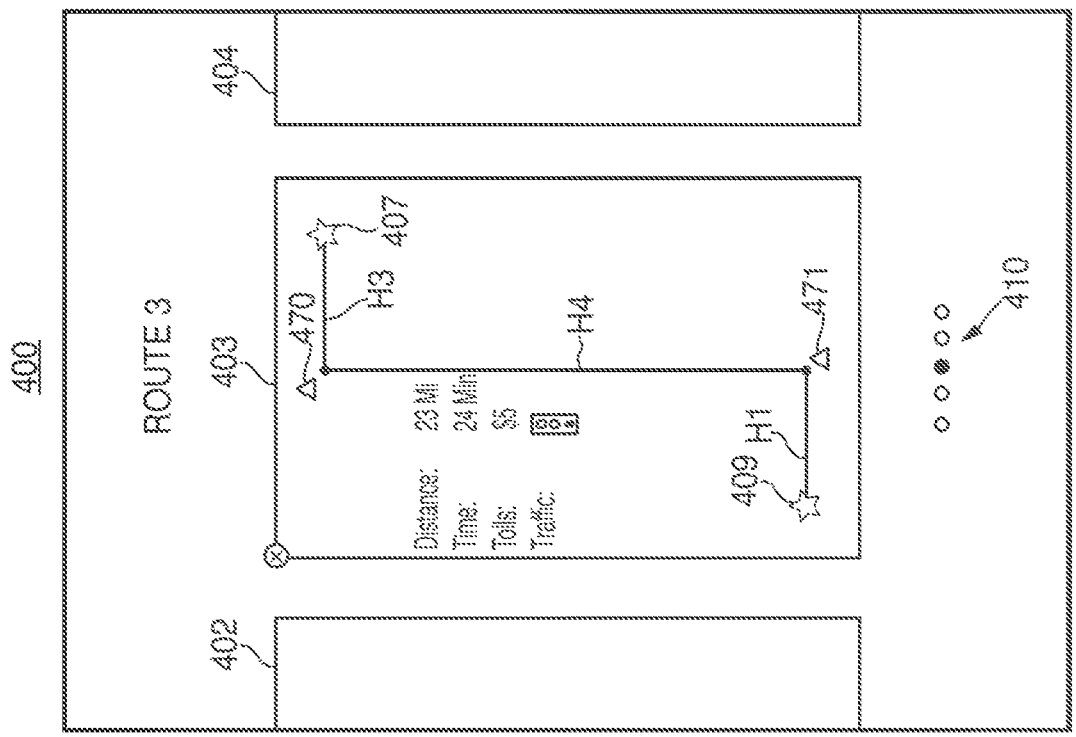
FIG. 4 shows an illustrative screen shot of navigation tiles in accordance with various embodiments.

FIG. 4 shows an illustrative screen shot of navigation tile selector 400 in accordance with various embodiments. As an alternative to list 300, navigation tiles may be slid back and forth. Status bar 410 may indicate how many calculated routes are available and which route is currently being displayed. Tile selector 400 shows navigation tile 403 situated between navigation tiles 402 and 403. Status bar 410 indicates that navigation tile 403 is the third of five available navigation tiles.

Figure 5:
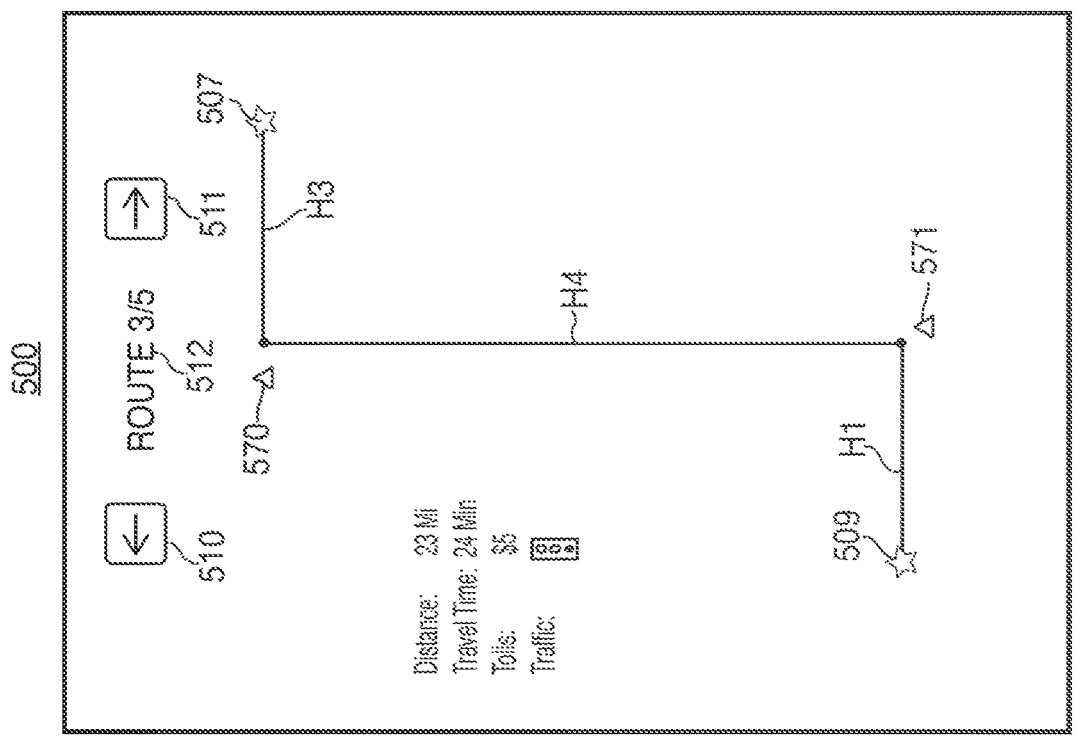
FIG. 5 shows an illustrative screen shot of a navigation tile in accordance with various embodiments.

FIG. 5 shows an illustrative screen shot of navigation tile selector 500 in accordance with various embodiments. Navigation tile selector is very similar to selector 400, except that it employs buttons 510 and 511 to choose between available navigation tiles. Title 512 indicates which navigation tile is actively being displayed and how many navigation tiles are available to choose from.

Figure 6:
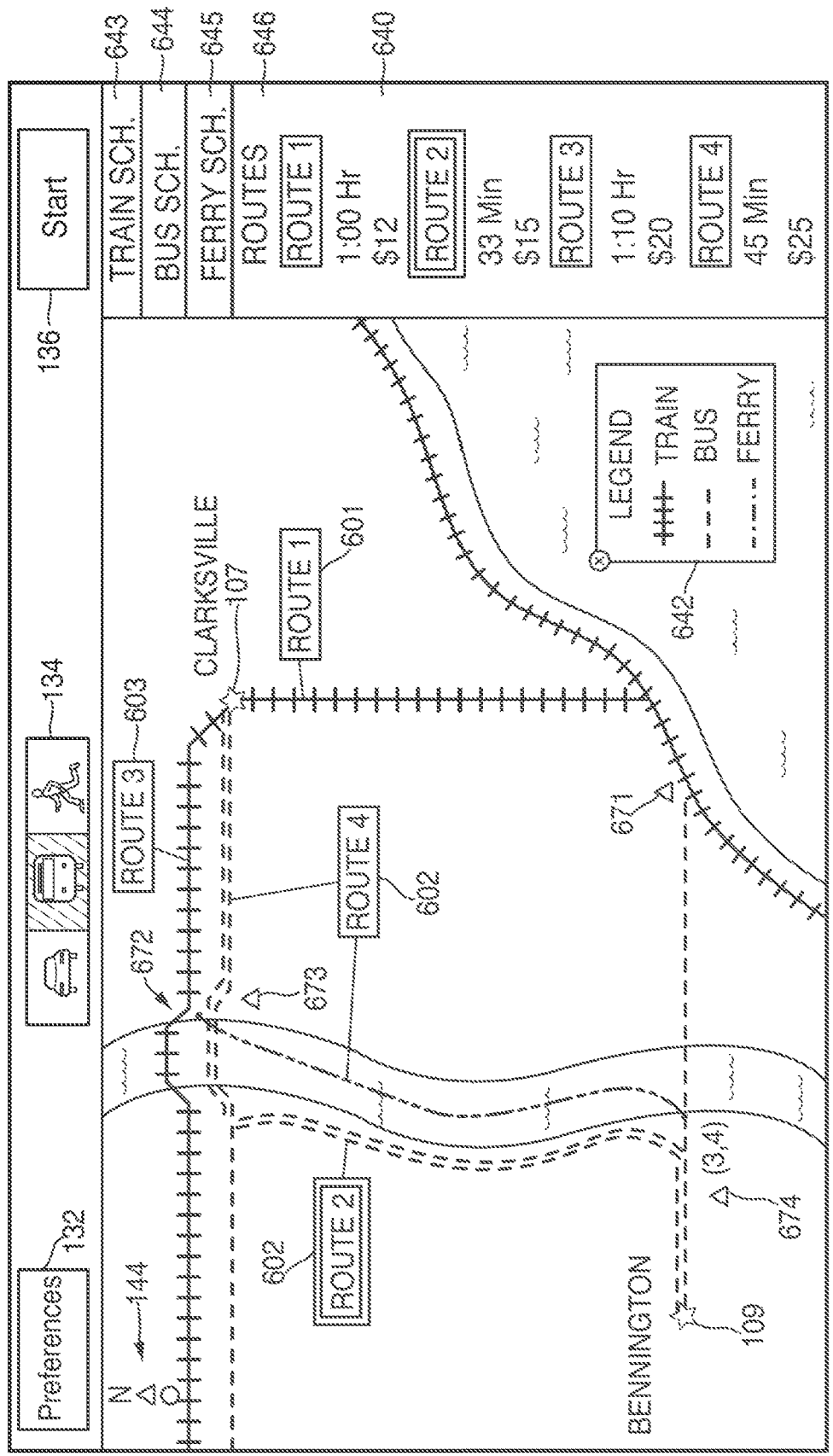
FIG. 6 shows an illustrative screen shot map with several alternative routes displayed simultaneously in accordance with various embodiments.

FIG. 6 shows an illustrative screen shot of a map 600 with several alternative transit routes displayed simultaneously in accordance with various embodiments. A user can enter transit mode by tapping the transit section, represented by a pictorial of a bus, of navigation mode button 134. The transit section of navigation mode button 134 is shaded to indicate that it is the active navigation mode. When the device enters transit mode, several public transportation routes can be calculated from starting point 107 to destination point 109. Map 600 shows three different transit options (train, bus, and ferry); however, any other transit options, such as subways, trolleys, and taxis, may be included in other embodiments. Legend 642 may be displayed to show a user the pictorial representations of the available transit options. As with the driving routes, each transit route can be highlighted simultaneously and in different colors so that they are easily distinguishable from one another. A user can choose a particular transit route by tapping the touch-sensitive screen anywhere along the route, or by tapping the callout associated with the desired, route.

Sidebar 640 can include collapsible fields 643, 644, 645, and 646, representing train schedules, bus schedules, ferry schedules, and route information, respectively. Tapping any one of the schedule fields 643, 644, or 645 may display scheduling information for that mode of transit. For example, tapping train schedule field 643 can give the user information about train schedules for the different calculated routes. According to some embodiments, schedules accessed by tapping fields 643, 644, and 645 may reside on a third party server (e.g., a website) and require the user to view the schedules in another application (i.e., a web browser). In other embodiments, the device can automatically download transit schedules and provide the scheduling information directly in the navigation application. If the user chooses one particular route, schedule information may only be provided for the transit options relevant to that route. For example, if Route 2 is chosen from map 600, tapping bus schedule field 644 may only display the schedule for bus routes along Route 2.

Route information field 646 in sidebar 640 can display key information regarding each calculated route. For example, the travel time and total price can be displayed for each calculated route. The estimated travel time and total price can be calculated from time and fee schedules downloaded to, or otherwise accessed by, the device. Time estimations can be dynamic and take into account the current time and the scheduled arrival time of each transit option. For example, if the train departing from Clarksville at starting point 107 departs every hour, the estimated travel time may include the amount of time between the current time and the next departure as well as the lag time between connecting from the train to the ferry at route change indicator 672 and the ferry to the bus at route change indicator 674, thereby giving an estimation of the total door-to-door time and not simply an aggregate of the time spent on each transit option.

Route change indicators 671, 672, 673, and 674 may be displayed in order to show the user where they will be required to change transit options. For example, the user will have to change from a train to a bus at the point indicated by route change indicator 671 along Route 1. In the event that it is not clear which route a particular route change indicator is associated with, the indicator may be highlighted in the color matching the route, or otherwise identified. For example, route change indicator 673 is along both Route 2 and Route 4; however, it only applies to Route 4 (a user traveling along Route 2 will remain on the bus, while a user traveling along Route 4 will change from a bus to a ferry at the point indicated at route change indicator 673). On map 600, the Route(s) associated with particular route change indicators are listed in parentheses after the 'Δ' symbol. If a particular route change indicator applies to more than one route, each associated route can be identified (e.g., route change indicator 674 is associated with Route 3 and Route 4).

Figure 7:
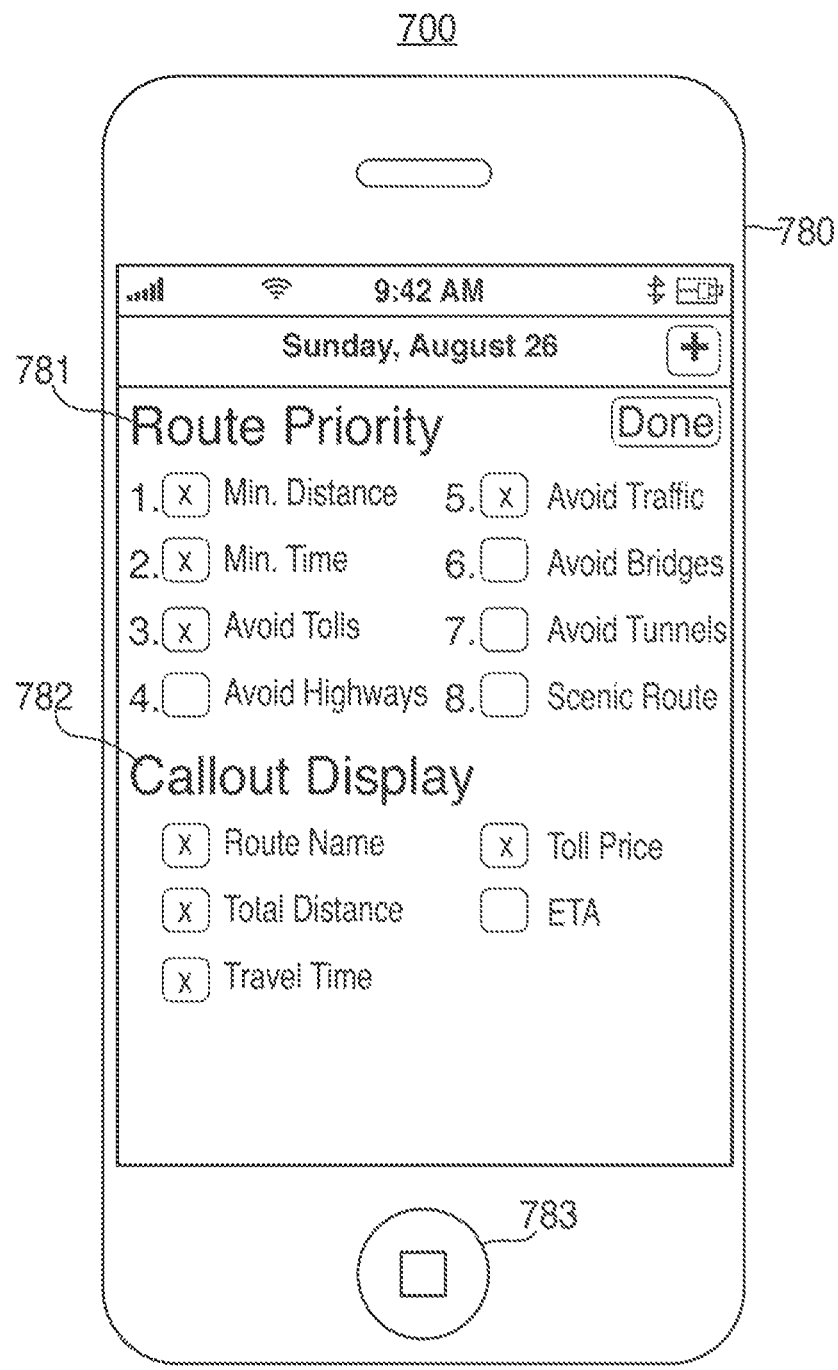
FIG. 7 shows an illustrative screen shot of an electronic device in accordance with various embodiments.

FIG. 7 shows an illustrative screen shot of an electronic device 700 in accordance with various embodiments. Device 700 includes screen 780, route priority menu 781, callout display menu 782, and input mechanism 783. Screen 780 shows a display of a preferences menu (e.g., the menu that would be displayed by tapping preferences button 132 of FIG. 1). Route priority menu 781 contains options that can allow device 700 to calculate navigational routes according to a user's preferences. A user can rank options in the route priority list according to their relative importance to the user. For example, menu 781 shows Min. Distance as the number one ranked option and Min. Time as the second. However, a user may choose to reorder the list. To reorder the list, a user may, for instance, tap and hold an option and drag it to the desired position in menu 781. A user may also choose to uncheck any of the options in order to remove that option from route calculations.

Callout display menu 782 controls the information that is provided to a user in callouts (e.g., callout 101 of FIG. 1). The options in menu 782 are not exhaustive and additional options may be added by the user or via software updates. Because callouts are designed to be unobtrusive, the user can rank the options in the order of personal preference. If all fields cannot be displayed in a callout, the fields may be displayed in the order they are ranked in menu 782. For example, if the options are set as in menu 782 and there is only enough space to display two fields in a callout, only the Route Name and Total Distance may be displayed. Additional fields may be displayed if a user desires, for example, by tapping and holding the callout.

Figure 8:
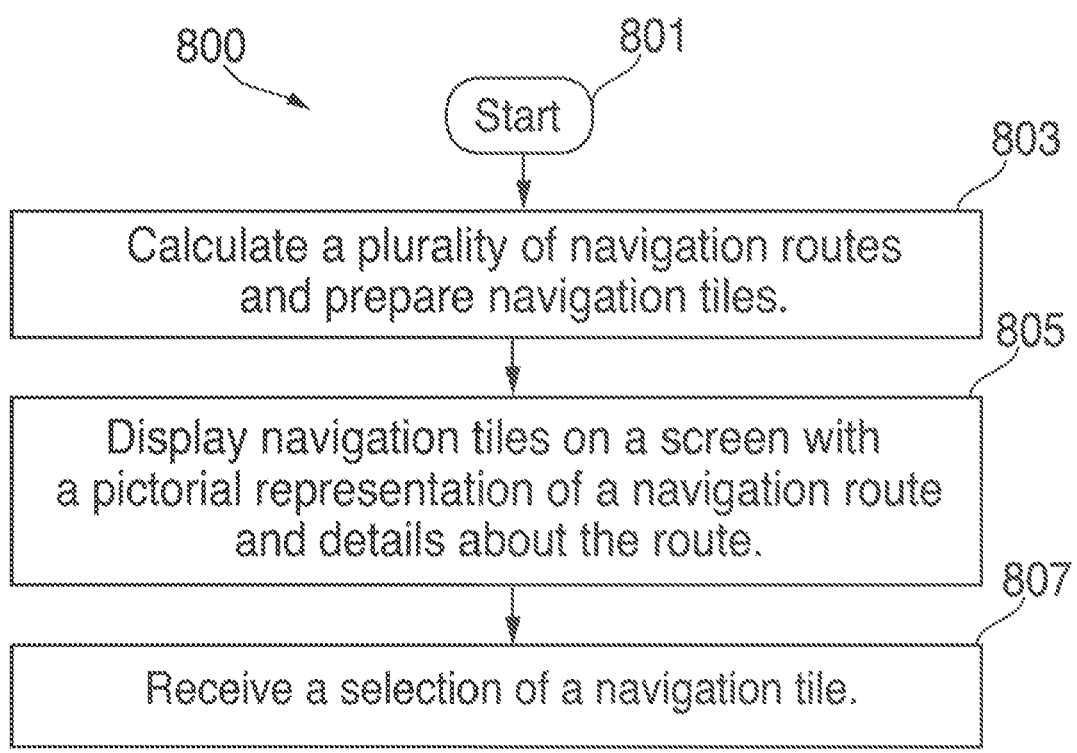
FIG. 8 shows a flowchart of a method for comparing and selecting alternative navigation routes in accordance with various embodiments.

FIG. 8 shows a flowchart of a method 800 for comparing and selecting alternative navigation routes in accordance with various embodiments. Method 800 begins at step 801 and proceeds to step 803, in which a number of navigation routes are calculated and navigation tiles are prepared. Navigation routes may be calculated in order to satisfy a set of user preferences. For example, a number of navigation routes may be calculated to coincide with the user preferences set in route priority menu 781 of FIG. 7. Navigation tiles may then be prepared for each route by generating a pictorial representation of each navigation route along with text information associated with the route.

In step 805, navigation tiles can be displayed on a screen with the pictorial representation of a navigation route and details about the route. For example, as described above with respect to FIG. 3, each navigation tile may include a simple pictorial depiction of the route associated with that tile, where the pictorial may include textual information regarding major roads and turns along the route. The detailed information may include helpful data associated with the route such as distance, travel time, tolls, and traffic. In some embodiments, the navigation tiles may be displayed in a list, like navigation tiles 301, 302, and 303 of FIG. 3. In further embodiments, a user may browse through the displayed navigation tiles by sliding the navigation tiles back and forth as described with respect to FIG. 4, using buttons as described with respect to FIG. 5, or using any other suitable method.

In step 807, the device can receive a selection of a navigation tile. A particular tile may be selected, for instance, by tapping the tile on a touch-sensitive screen. Once a navigation tile has been selected, a more detailed map, such as the maps depicted in FIG. 1, FIG. 2, and FIG. 6, which corresponds to the navigation tile selected at step 807 may be displayed.

Figure 9:
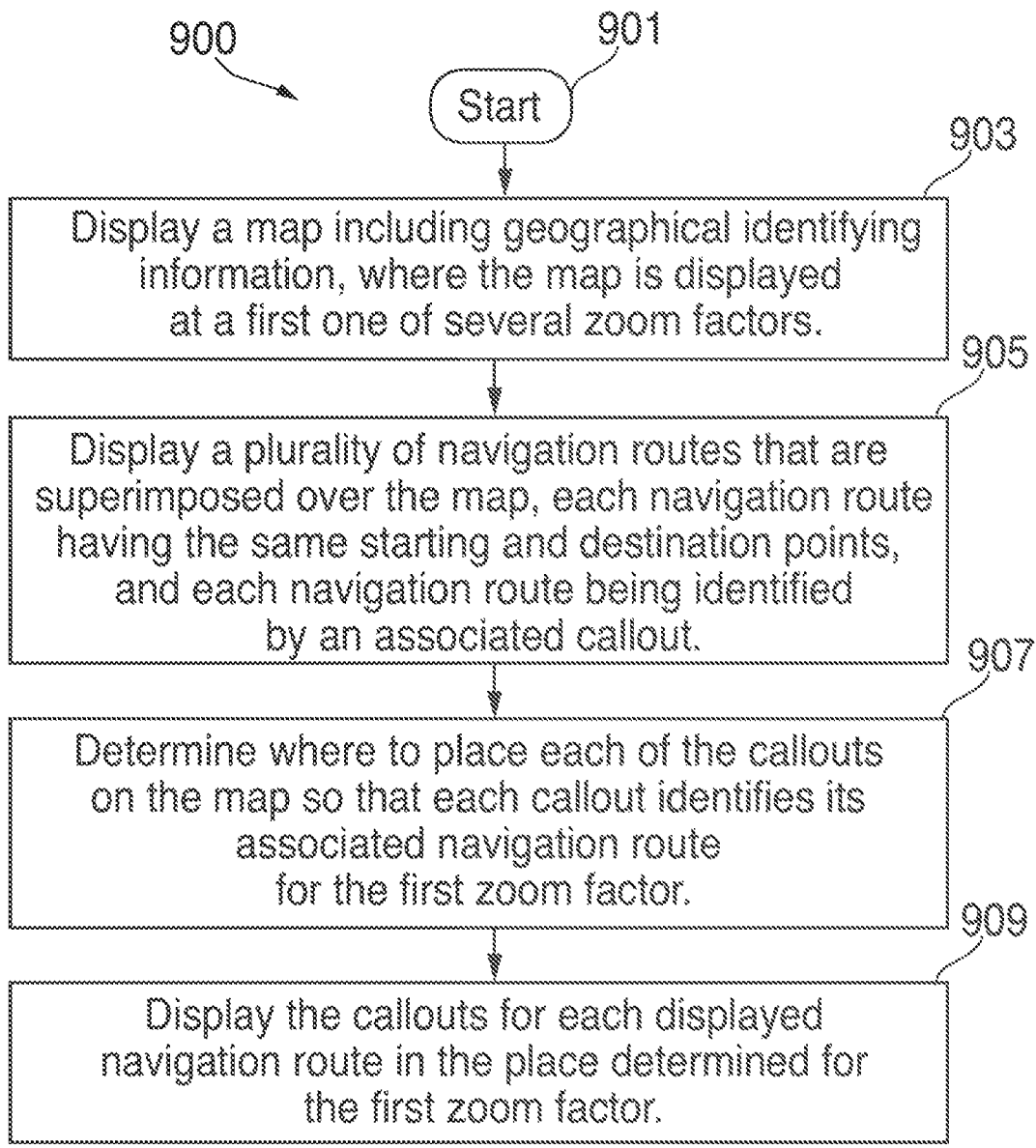
FIG. 9 shows a flowchart of a method for comparing and selecting alternative navigation routes in accordance with various embodiments.

FIG. 9 shows a flowchart of a method 900 for comparing and selecting alternative navigation routes in accordance with various embodiments. Method 900 begins at step 901 and proceeds to step 903 in which a map including geographical identifying information is displayed at a first one of several zoom factors. For example, the zoom factor may result in the entire route (e.g., from the start point to the destination) being displayed. Alternatively, the zoom factor may result in only a portion of the route being displayed (e.g., the area immediately surrounding the user's current position).

At step 905, navigation routes superimposed over the map may be displayed. Each navigation route can have the same starting and destination points, and each navigation route may be identified by an associated callout. For example, various routes between the starting and destination points and their associated callouts may be superimposed on the map, which is displayed at the first zoom factor. As described with respect to FIG. 1, the zoom factor may allow for each navigation route to be displayed in its entirety. However, as described with respect to FIG. 2, at other zoom factors only portions of some routes may be displayed.

At step 907, where to place each of the callouts on the map so that each callout identifies its associated navigation route for the first zoom factor may be determined. For example, if each navigation route is displayed in its entirety at the first zoom factor, the callouts may be displayed such that they clearly and unobtrusively identify their associated navigation routes. Alternatively, if only portions of some routes are displayed at the first zoom factor, callouts may indicate various information about routes that are not displayed, including the distance and direction to those routes from a user's current position. At step 909, the callouts for each displayed navigation route can be displayed in the place determined for the first zoom factor.

Figure 10:
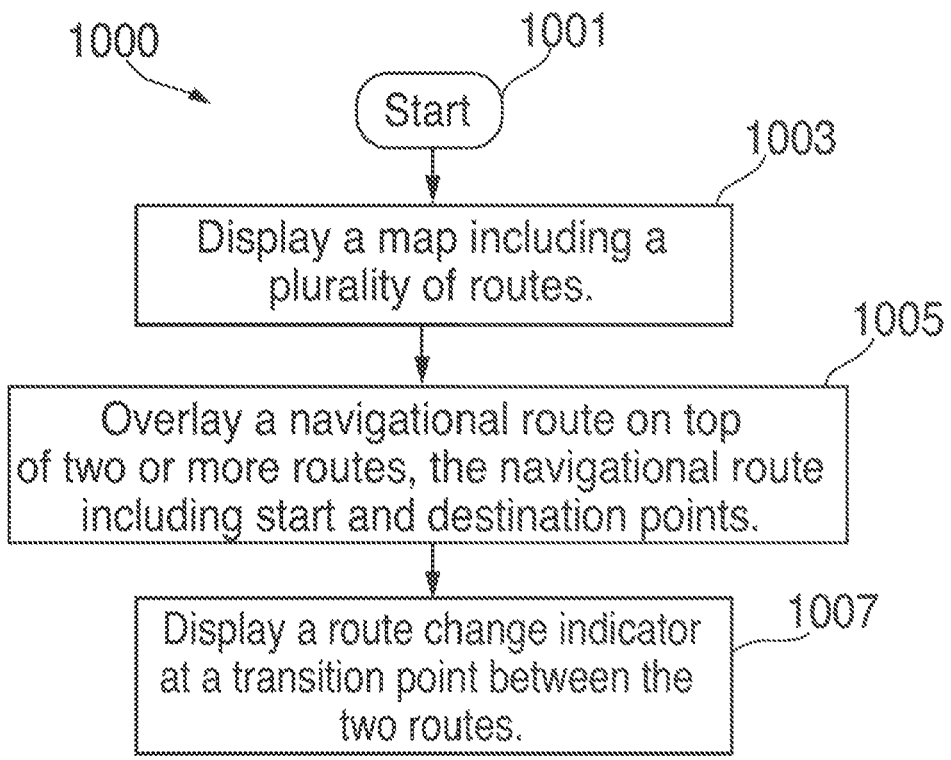
FIG. 10 shows a flowchart of a method for comparing and selecting alternative navigation routes in accordance with various embodiments.
Figure 11:
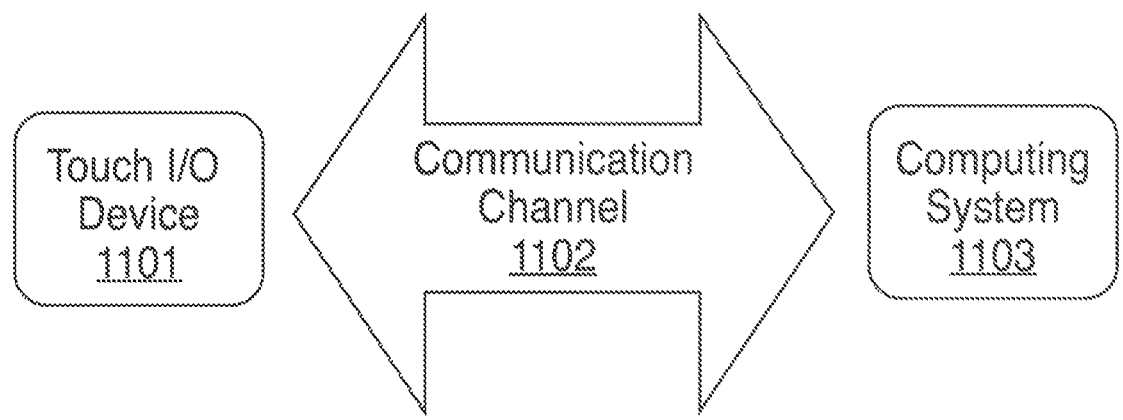
FIG. 11 is a schematic view of an illustrative touch I/O device that can receive touch input for interacting with a computing system via wired or wireless communication channel in accordance with some embodiments of the invention.

FIG. 10 shows a flowchart of a method 1000 for comparing and selecting alternative navigation routes in accordance with various embodiments. Method 1000 begins at step 1001 and proceeds to step 1003 in which a map including a plurality of routes is displayed. At step 1005, a navigational route may be overlaid on top of two or more routes. The navigational roué may include start and destination points. The map may be, for example, map 600 of FIG. 6 with routes associated with route callouts 601, 602, 603, and 604.

At step 1007, a route change indicator may be displayed at a transition point between the two routes. For example, in transit mode, a route change indicator may indicate where a user will be required to change transit options (e.g., from ferry to bus or from train to ferry. In other embodiments, route-change indicators may indicate where a user will be required to turn (or take other appropriate action).

It is to be understood that the steps shown in methods 800, 900, and 1000 are merely illustrative and that existing steps may be modified or omitted, additional steps may be added, and the order of certain steps may be altered.

Moreover, the methods described with respect to FIGS. 8-10, as well as any other aspects of the invention, may each be implemented by software, but may also be implemented in hardware, firmware, or any combination of software, hardware, and firmware. They each may also be embodied as machine-readable code recorded on a machine-readable medium. The machine-readable medium may be any data storage device that can store data that can thereafter be read by a computer system. Examples of the machine-readable medium may include, but are not limited to, read-only memory, random-access memory, flash memory, CD-ROMs, DVDs, magnetic tape, and optical data storage devices. The machine-readable medium can also be distributed over network-coupled computer systems so that the machine-readable code is stored and executed in distributed fashion.

Described embodiments may include touch I/O device 1101 that can receive touch input for interacting with computing system 1103 (FIG. 9) via wired or wireless communication channel 1102. Touch I/O device 1101 may be used to provide user input to computing system 1103 in lieu of or in combination with other input devices such as a keyboard, mouse, etc. One or more touch I/O devices 1101 may be used for providing user input to computing system 1103. Touch I/O device 1101 may be an integral part of computing system 1103 (e.g., touch screen on a laptop) or may be separate from computing system 1103.

Touch I/O device 1101 may include a touch sensitive panel which is wholly or partially transparent, semitransparent, non-transparent, opaque or any combination thereof. Touch I/O device 1101 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1101 embodied as a touch screen may include a transparent and/or semitransparent touch sensitive panel partially or wholly positioned over at least a portion of a display. According to this embodiment, touch I/O device 1101 functions to display graphical data transmitted from computing system 1103 (and/or another source) and also functions to receive user input. In other embodiments, touch I/O device 1101 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1101 may be configured to detect the location of one or more touches or near touches on touch I/O device 1101 based on capacitive, resistive, optical, acoustic, inductive, mechanical, chemical measurements, or any phenomena that can be measured with respect to the occurrences of the one or more touches or near touches in proximity to touch I/O device 1101. Software, hardware, firmware or any combination thereof may be used to process the measurements of the detected touches to identify and track one or more gestures. A gesture may correspond to stationary or non-stationary, single or multiple, touches or near touches on touch I/O device 1101. A gesture may be performed by moving one or more fingers or other objects in a particular manner on touch I/O device 1101 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1103 may drive a display with graphical data to display a graphical user interface (GUI). The GUI may be configured to receive touch input via touch I/O device 1101. Embodied as a touch screen, touch I/O device 1101 may display the GUI. Alternatively, the GUI may be displayed on a display separate from touch I/O device 1101. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1101 which may be associated with the graphical elements of the GUI. In other embodiments, the user may perform gestures at one or more locations that are independent of the locations of graphical elements of the GUI. Gestures performed on touch I/O device 1101 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1103 (e.g., affect a state or mode of a GUI, application, or operating system). Gestures may or may not be performed on touch I/O device 1101 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1102 in response to or based on the touch or near touches on touch I/O device 1101. Feedback may be transmitted optically, mechanically, electrically, olfactory, acoustically, or the like or any combination thereof and in a variable or non-variable manner.

Figure 12:
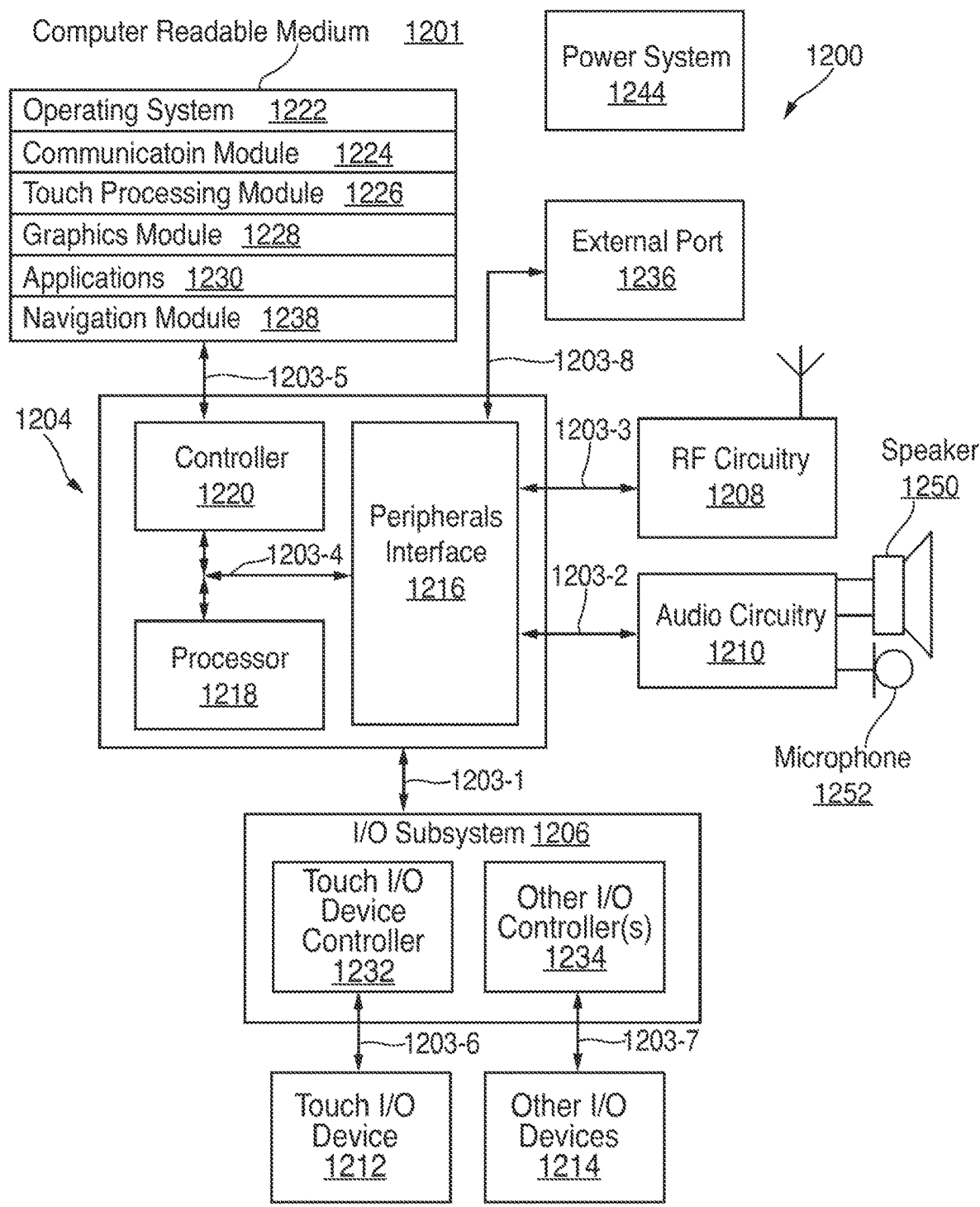
FIG. 12 is a block diagram of an illustrative system for providing alternative navigation routes in accordance with some embodiments of the invention.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 1200, including combinations of two or more of these types of devices. FIG. 12 is a block diagram of one embodiment of system 1200 that generally includes one or more computer-readable mediums 1201, processing system 1204, Input/Output (I/O) subsystem 1206, radio frequency (RF) circuitry 1208 and audio circuitry 1210.

These components may be coupled by one or more communication buses or signal lines 1203.

It should be apparent that the architecture shown in FIG. 12 is only one example architecture of system 1200, and that system 1200 could have more or fewer components than shown, or a different configuration of components. The various components shown in FIG. 12 can be implemented in hardware, software, firmware or any combination thereof, including one or more signal processing and/or application specific integrated circuits.

RF circuitry 1208 is used to send and receive information over a wireless link or network to one or more other devices and includes well-known circuitry for performing this function. RF circuitry 1208 and audio circuitry 1210 are coupled to processing system 1204 via peripherals interface 1216. Peripherals interface 1216 includes various known components for establishing and maintaining communication between peripherals and processing system 1204. Audio circuitry 1210 is coupled to audio speaker 1250 and microphone 1252 and includes known circuitry for processing voice signals received from peripherals interface 1216 to enable a user to communicate in real-time with other users. In some embodiments, audio circuitry 1210 includes a headphone jack (not shown).

Peripherals interface 1216 couples the input and output peripherals of the system to processor 1218 and computer-readable medium 1201. One or more processors 1218 communicate with one or more computer-readable mediums 1201 via controller 1220. Computer-readable medium 1201 can be any device or medium that can store code and/or data for use by one or more processors 1218. Medium 1201 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1201 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MANs) and the like.

One or more processors 1218 run various software components stored in medium 1201 to perform various functions for system 1200. In some embodiments, the software components include operating system 1222, communication module (or set of instructions) 1224, touch processing module (or set of instructions) 1226, graphics module (or set of instructions) 1228, one or more applications (or set of instructions) 1230, and navigation module [or set of instructions] 1238. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 1201 may store a subset of the modules and data structures identified above. Furthermore, medium 1201 may store additional modules and data structures not described above.

Operating system 1222 includes various procedures, sets of instructions, software components and/or drivers for controlling and managing general system tasks (e.g., memory management, storage device control, power management, etc.) and facilitates communication between various hardware and software components.

Communication module 1224 facilitates communication with other devices over one or more external ports 1236 or via RF circuitry 1208 and includes various software components for handling data received from RF circuitry 1208 and/or external port 1236.

Graphics module 1228 includes various known software components for rendering, animating and displaying graphical objects on a display surface. In embodiments in which touch I/O device 1212 is a touch sensitive display (e.g., touch screen), graphics module 1228 includes components for rendering, displaying, and animating objects on the touch sensitive display.

One or more applications 1230 can include any applications installed on system 1200, including without limitation, navigation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 1226 includes various software components for performing various tasks associated with touch I/O device 1212 including but not limited to receiving and processing touch input received from touch I/O device 1212 via touch I/O device controller 1232.

System 1200 may further include navigation module 1238 for performing the method/functions as described herein in connection with FIGS. 1-8. Navigation module 1238 may at least function to calculate navigation routes based on at least a starting point and destination point (e.g., starting point 107 and destination point 109 of FIG. 1). Navigation module 1238 may also incorporate route priority preferences (e.g., route priority preferences 781 of FIG. 7). A location determination capability (such as that provided by the global positioning system (GPS)) can be included as part of navigation module 1238 or as a separate module that can interact with navigation module 1238. Navigation module 1238 may also interact with touch processing module 1226 to receive user input and one or more applications 1230 (e.g., a navigation application). Navigation module 1238 may be embodied as hardware, software, firmware, or any combination thereof. Although navigation module 1238 is shown to reside within medium 1201, all or portions of navigation module 1238 may be embodied within other components within system 1200 or may be wholly embodied as a separate component within system 1200.

I/O subsystem 1206 is coupled to touch I/O device 1212 and one or more other I/O devices 1214 for controlling or performing various functions. Touch I/O device 1212 communicates with processing system 1204 via touch I/O device controller 1232, which includes various components for processing user touch input (e.g., scanning hardware). One or more other input controllers 1234 receives/sends electrical signals from/to other I/O devices 1214. Other I/O devices 1214 may include physical buttons, dials, slider switches, sticks, keyboards, touch pads, additional display screens, or any combination thereof.

If embodied as a touch screen, touch I/O device 1212 displays visual output to the user in a GUI. The visual output may include text, graphics, video, and any combination thereof. Some or all of the visual output may correspond to user-interface objects. Touch I/O device 1212 forms a touch-sensitive surface that accepts touch input from the user. Touch I/O device 1212 and touch I/O device controller 1232 (along with any associated modules and/or sets of instructions in medium 1201) detects and tracks touches or near touches (and any movement or release of the touch) on touch I/O device 1212 and converts the detected touch input into interaction with graphical objects, such as one or more user-interface objects. In the case in which touch I/O device 1212 is embodied as a touch screen, the user can directly interact with graphical objects that are displayed on the touch screen. Alternatively, in the case in which touch I/O device 1212 is embodied as a touch device other than a touch screen (e.g., a touch pad), the user may indirectly interact with graphical objects that are displayed on a separate display screen embodied as I/O device 1214.

Touch I/O device 1212 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 1002/0015024A1, each of which is hereby incorporated by reference.

Embodiments in which touch I/O device 1212 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 1212 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1200 also includes power system 1244 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 1216, one or more processors 1218, and controller 1220 may be implemented on a single chip, such as processing system 1204. In some other embodiments, they may be implemented on separate chips.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions, which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied, for example, by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments, the application or client program may incorporate calls to functions or methods provided by the SDK and provided by the API, or use data types or objects defined in the SDK and provided by the API. An Application Framework may, in these embodiments, provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 13:
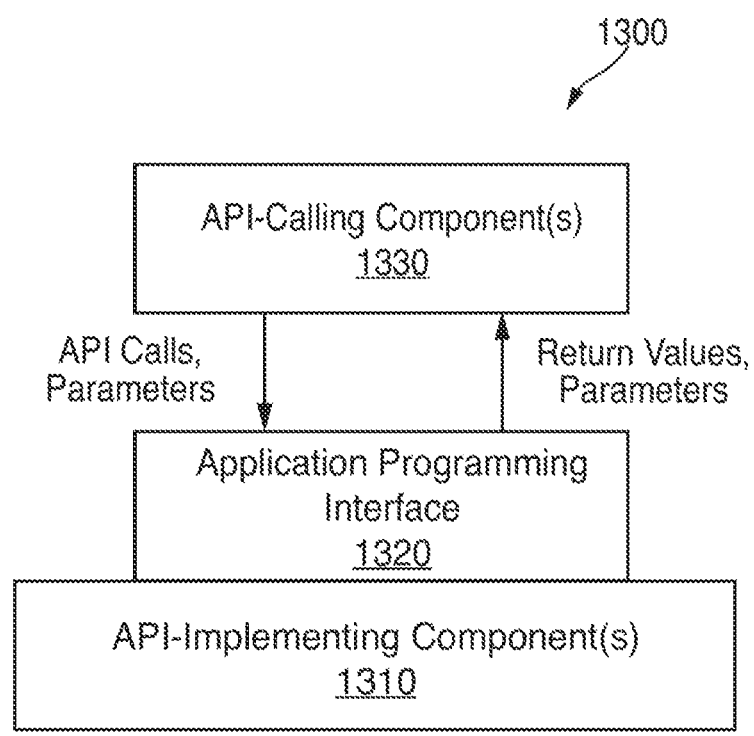
FIG. 13 is a block diagram illustrating an exemplary API architecture in accordance with some embodiments of the invention.

FIG. 13 is a block diagram illustrating an exemplary API architecture, which may be used in some embodiments of the invention. As shown in FIG. 13, the API architecture 1300 includes the API-implementing component 1310 (e.g., an operating system, a library, a device driver, an API, an application program, software or other module) that implements the API 1320. The API 1320 specifies one or more functions, methods, classes, objects, protocols, data structures, formats and/or other features of the API-implementing component that may be used by the API-calling component 1330. The API 1320 can specify at least one calling convention that specifies how a function in the API-implementing component receives parameters from the API-calling component and how the function returns a result to the API-calling component. The API-calling component 1330 (e.g., an operating system, a library, a device driver, an API, an application program, software or other module), makes API calls through the API 1320 to access and use the features of the API-implementing component 1310 that are specified by the API 1320. The API-implementing component 1310 may return a value through the API 1320 to the API-calling component 1330 in response to an API call.

It will be appreciated that the API-implementing component 1310 may include additional functions, methods, classes, data structures, and/or other features that are not specified through the API 1320 and are not available to the API-calling component 1330. It should be understood that the API-calling component 1330 may be on the same system as the API-implementing component 1310 or may be located remotely and accesses the API-implementing component 1310 using the API 1320 over a network. While FIG. 13 illustrates a single API-calling component 1330 interacting with the API 1320, it should be understood that other API-calling components, which may be written in different languages (or the same language) than the API-calling component 1330, may use the API 1320.

The API-implementing component 1310, the API 1320, and the API-calling component 1330 may be stored in a machine-readable medium, which includes any mechanism for storing information in a form readable by a machine (e.g., a computer or other data processing system). Examples of machine-readable media include magnetic disks, optical disks, random access memory, read only memory, flash memory devices, etc.

Figure 14:
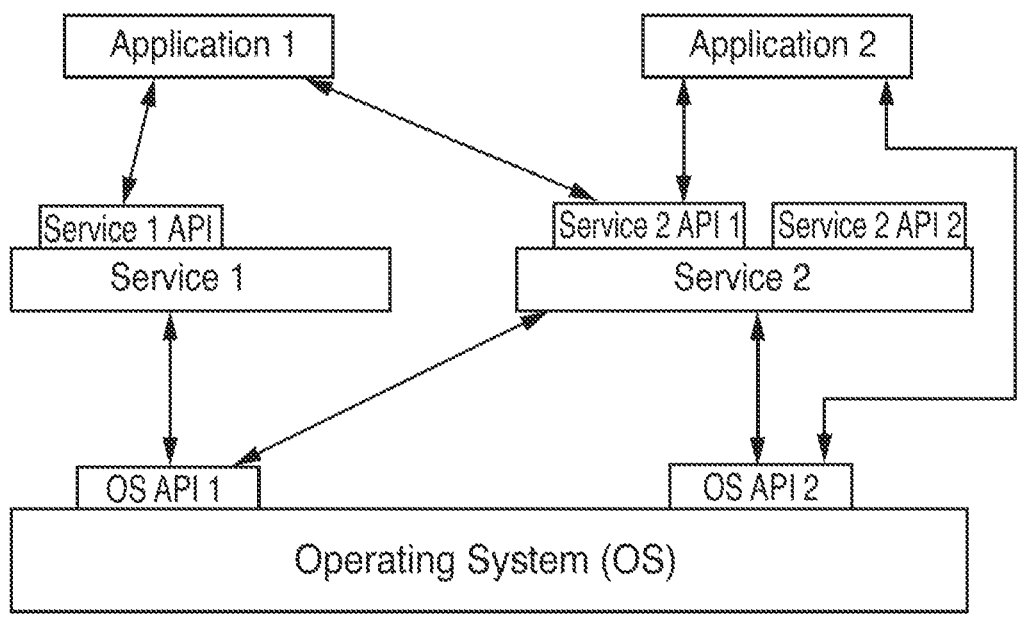
FIG. 14 is a block diagram of an illustrative software stack by which applications can make calls to Services A or B using APIs in accordance with some embodiments of the invention.

In FIG. 14 ("Software Stack"), an exemplary embodiment, applications can make calls to Services 1 or 2 using several Service APIs and to Operating System (OS) using several OS APIs. Services 1 and 2 can make calls to the OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A non-transitory computer readable medium comprising instructions which, when executed by one or more hardware processors, causes performance of operations comprising:

calculating a plurality of routes from a starting point to a destination point;

displaying a map on a display screen of a computing device;

displaying at least a portion of a first route, of the plurality of routes, overlaid on the map;

concurrently with displaying the first route of the plurality of routes:

displaying a first callout overlaid on the map, the first callout being associated with a second route of the plurality of routes and including one or more attributes corresponding to the second route, wherein displaying the first callout comprises:
  placing the first callout on the map at a first position that is based on a location of relative to the second route on the map; or
  connecting a component of the first callout to a portion of the second route on the map;
receiving a selection of the first callout associated with the second route; and
responsive to receiving the selection of the first callout, providing navigation information corresponding to the second route.

2. The non-transitory computer readable medium as recited in claim 1, wherein the operations further comprise:
  concurrently with displaying the first route of the plurality of routes, displaying a second callout overlaid on the map, the second callout being associated with the first route and including one or more attributes corresponding to the first route.

3. The non-transitory computer readable medium as recited in claim 1, wherein the operations further comprise:
  in response to receiving a selection of the first callout, altering the first callout to display at least one additional attribute corresponding to the second route.

4. The non-transitory computer readable medium as recited in claim 1, wherein the operations further comprise:
  displaying at least a portion of the second route overlaid on the map, wherein the first route is differentiable on the map from the second route.

5. The non-transitory computer readable medium as recited in claim 4, wherein the first route is highlighted in a different color than the second route.

6. The non-transitory computer readable medium as recited in claim 4, wherein the first route is displayed more prominently than the second route.

7. The non-transitory computer readable medium as recited in claim 1, wherein the first route includes a route-change indicator, the route-change indicator representing a location for navigation information instruction for the first route.

8. The non-transitory computer readable medium as recited in claim 1, wherein the second route is a non-displayed route.

9. The non-transitory computer readable medium as recited in claim 1, wherein the first route is a currently selected route and the second route is a non-selected route.

10. The non-transitory computer readable medium as recited in claim 1, wherein the operations further comprise:
  in response to receiving a selection of the first callout, displaying at least a portion of the second route.

11. A method comprising:
  calculating, by a computing device, a plurality of routes from a starting point to a destination point;
  displaying, by the computing device, a map on a display screen of the computing device;
  displaying, by the computing device, at least a portion of a first route, of the plurality of routes, overlaid on the map;
  concurrently with displaying the first route of the plurality of routes:
    displaying, by the computing device, a first callout overlaid on the map, the first callout being associated with a second route of the plurality of routes and including one or more attributes corresponding to the second route,
  wherein displaying the first callout comprises:
    placing the first callout on the map at a first position that is based on a location of the second route on the map; or
    connecting a component of the first callout to a portion of the second route on the map;
  receiving a selection of the first callout associated with the second route; and
  responsive to receiving the selection of the first callout, providing navigation information corresponding to the second route.

12. The method as recited in claim 11, further comprising, concurrently with displaying the first route of the plurality of routes, displaying a second callout overlaid on the map, the second callout being associated with the first route and including one or more attributes corresponding to the first route.

13. The method as recited in claim 11, further comprising, in response to receiving a selection of the first callout, altering the first callout to display at least one additional attribute corresponding to the second route.

14. The method as recited in claim 11, further comprising displaying at least a portion of the second route overlaid on the map, wherein the first route is differentiable on the map from the second route.

15. The method as recited in claim 14, wherein the first route is highlighted in a different color than the second route and/or the first route is displayed more prominently than the second route.

16. The method as recited in claim 11, wherein the second route is a non-displayed route.

17. The method as recited in claim 11, wherein the first route is a currently selected route and the second route is a non-selected route.

18. The method as recited in claim 11, further comprising, in response to receiving a selection of the first callout, displaying at least a portion of the second route.

19. An electronic device, comprising:
  a display screen;
  one or more hardware processors; and
  a non-transitory computer readable medium comprising instructions which, when executed by the one or more hardware processors, causes performance of operations comprising:
  calculating a plurality of routes from a starting point to a destination point;
  displaying a map on the display screen;
  displaying at least a portion of a first route, of the plurality of routes, overlaid on the map;
  concurrently with displaying the first route of the plurality of routes:
    displaying a first callout overlaid on the map, the first callout being associated with a second route of the plurality of routes and including one or more attributes corresponding to the second route,
  wherein displaying the first callout comprises:
    placing the first callout on the map at a first position that is based on a location of the second route on the map; or
    connecting a component of the first callout to a portion of the second route on the map;
  receiving a selection of the first callout associated with the second route; and
  responsive to receiving the selection of the first callout, providing navigation information corresponding to the second route.

20. The electronic device as recited in claim 19, wherein the operations further comprise:
- concurrently with displaying the first route of the plurality of routes, displaying a second callout overlaid on the map, the second callout being associated with the first route and including one or more attributes corresponding to the first route; and
- in response to receiving a selection of the first callout, altering the first callout to display at least one additional attribute corresponding to the second route.

21. The non-transitory computer readable medium as recited in claim 1, wherein providing the navigation information corresponding to the second route comprises:
- switching from providing navigation information corresponding to the first route to providing the navigation information corresponding to the second route.

\* \* \* \* \*